United States Patent
Boesch et al.

(10) Patent No.: US 8,328,163 B2
(45) Date of Patent: Dec. 11, 2012

(54) VACUUM VALVE WITH A SEALING RING

(75) Inventors: Hubert Boesch, Lustenau (AT); Stefan Boesch, Lustenau (AT)

(73) Assignee: VSE Vacuum Technology, Lustenau (AT)

( * ) Notice: Subject to any disclaimer, the term of this patent is extended or adjusted under 35 U.S.C. 154(b) by 602 days.

(21) Appl. No.: 12/351,631

(22) Filed: Jan. 9, 2009

(65) Prior Publication Data
US 2009/0173905 A1 Jul. 9, 2009

(30) Foreign Application Priority Data
Jan. 9, 2008 (DE) .................... 10 2008 003 725

(51) Int. Cl.
*F16K 1/00* (2006.01)
*F16K 15/00* (2006.01)
(52) U.S. Cl. .................... 251/333; 251/363
(58) Field of Classification Search .............. 251/333, 251/334, 359, 361, 363, 368
See application file for complete search history.

(56) References Cited

U.S. PATENT DOCUMENTS

| | | | | |
|---|---|---|---|---|
| 3,146,006 A * | 8/1964 | Schmohl | .................... | 285/212 |
| 4,318,532 A * | 3/1982 | Winkler | .................... | 251/334 |
| 4,431,159 A * | 2/1984 | Stubbs | .................... | 251/63.6 |
| 4,458,905 A | 7/1984 | Bösch | | |
| 4,627,599 A * | 12/1986 | Ehmig | .................... | 251/334 |
| 4,867,338 A * | 9/1989 | Bingham | .................... | 220/378 |
| 4,922,957 A * | 5/1990 | Johnson | .................... | 137/516.29 |
| 4,923,173 A * | 5/1990 | Szymaszek et al. | .................... | 251/333 |
| 4,988,075 A * | 1/1991 | Bosch | .................... | 251/158 |
| 6,478,043 B2 * | 11/2002 | Ishigaki | .................... | 137/341 |
| 6,698,719 B2 * | 3/2004 | Geiser | .................... | 251/332 |
| 2006/0169940 A1 * | 8/2006 | Mayer et al. | .................... | 251/301 |

FOREIGN PATENT DOCUMENTS
DE 4446947 A1 7/1996

* cited by examiner

*Primary Examiner* — John Bastianelli
*Assistant Examiner* — Seth Faulb
(74) *Attorney, Agent, or Firm* — The Maxham Firm

(57) ABSTRACT

A vacuum valve with a seating ring having a generally rectangular cross section. With respect to rectangular edges lying diametrically opposite one another, radii of curvature are arranged in these edges, which radii of curvature come into sealing engagement with sealing seats arranged lying opposite one another on the housing side and the disk side. The sealing surfaces on the sealing seats have approximately the same cone angle. The sealing ring is easy to produce, has a small rolling path and there is no danger of damage to the valve seats by the sealing ring.

9 Claims, 2 Drawing Sheets

VACUUM VALVE WITH A SEALING RING

FIELD OF THE INVENTION

The invention relates generally to a vacuum valve with a sealing ring and, more particularly, to the sealing ring having positive seal surfaces bearing on the valve housing and the valve disk.

DISCUSSION OF THE PRIOR ART

A vacuum valve of this general type became known with the subject matter of German patent publication DE 2947585 A1, which is suitable for being arranged in a vacuum line in order to block off vacuums in the range from atmospheric pressure up to ultra-high vacuum. For vacuum valves of this type it is known to arrange so-called sealing rings between a valve disk and a valve seat on the housing side. The cited '585 reference, describes different embodiments of sealing rings, wherein, for example, in FIG. 6 a rectangular sealing ring is shown, which in the transition from the sealing position to the open position is subjected to bending that causes great stress in the material. Since the surfaces of this known sealing ring are embodied in a conical manner, a sealing ring of this type is very difficult to produce.

Because it has a relatively thin cross section, and is subjected to a tilting during the transition from the closed position to the open position, there is otherwise the danger of this ring snapping over with the action of certain forces and no longer fulfilling its sealing function. It thus can run into corresponding mating surfaces at the valve seat, remove chips there, and irreparably damage the sealing seat.

An improvement in this situation was attempted with the subject matter of German patent publication DE 4446947 A1. This deviated from the rectangular cross section of the sealing ring and instead a double-conical sealing ring was used, which has on its outer circumference radii respectively lying opposite one another and a constriction lying between. The reason for the production of these constrictions is to embody the two sealing ring halves lying opposite one another in a moveable manner with respect to one another. Particular importance was attached thereby to the circumstance that this ring should have the largest possible rolling path with the lowest possible inherent resistance. This ring therefore has the referenced constriction in its cross section. However, it has been proven that the constrictions used in this apparatus are disadvantageous on a double-conical scaling ring, because very high stresses act on this reduced cross section. Due to the radii lying opposite one another, the ring is greatly compressed in order to apply the corresponding sealing forces between the valve seats lying opposite one another. Very strong shearing stresses thus act on the reduced cross section, which can be associated with damage thereto.

Due to the large rolling path, bending stresses are also produced in the double-conical ring of this '947 publication, which in turn have to be absorbed by the relatively thin center cross section. This ring is deformed elastically through the bending stresses acting on the ring during the transition between the open position into the closed position, and the risk exists thereby that the ring is not subjected to a corresponding bending, but instead is pushed along the valve seat lying opposite, which leads to irreparable, chip-removing changes to the valve seat lying opposite. The sealing surfaces are thereby destroyed and rendered unusable.

A further disadvantage of this known double-conical ring is that the production is very complicated, because very many conical surfaces with different radii have to be produced and special tools and holding fixtures are necessary.

SUMMARY OF THE INVENTION

A purpose of the present invention is to provide a sealing ring for a known vacuum valve such that it can be produced more easily with an essentially rectangular cross section, has a smaller rolling path than prior structures, and there is no risk of damage to the valve seats arranged on the housing side.

A feature of embodiments of the invention is that the sealing ring comprises essentially a rectangular cross section and that with respect to rectangular edges lying diametrically opposite one another, radii of curvature are arranged in these edges, which radii of curvature come into sealing engagement with sealing seats arranged lying opposite one another on the housing side and the disk side. The sealing surfaces arranged respectively on the housing and disk sealing seats have approximately the same cone angle.

It is also a feature of embodiments of the invention that the "neutral axis" of the sealing ring during the bending thereof, due to the movement of the valve disk, always lies approximately perpendicular to the movement direction of the valve disk. "Neutral axis" is used herein to describe the zone of the cross section of the sealing ring, the length of which does not change during its bending operation due to the movement of the valve disk. The bending stress in the neutral axis is equal to zero. With double-symmetrical cross sections, it lies respectively at the level of the centroid axis and between the extreme fibers, which are expanded or compressed.

With the given technical teaching the advantage now results that during the transition from the open position to the closed position and back, the sealing ring according to embodiments of invention performs a straight-line movement and is not subjected to any, or only to slight, change in its cross section (deformation) loaded with shearing stress or buckling stress.

Due to the linear movement of the sealing ring according to embodiments of the invention, a significant advantage is achieved compared to the prior art since, for example, with the subject matter of the '585 publication, the sealing ring shown there performs a tilting movement with all of the disadvantages that have been described above.

Now it is possible for the first time to create a sealing ring profiled in a rectangular manner, which is characterized in that corresponding radii of curvature embodied to be approximately the same size are arranged in two edges of the rectangular profile lying diametrically opposite one another, wherein the one radius of curvature joins the conical surface of the housing side and forms the housing-side sealing seat, while the radius of curvature lying opposite comes into engagement in a sealing manner at the sealing ring on the disk-side conical surface.

It is preferred hereby that the housing-side conical surface and the disk-side conical surface of the two sealing seats lying opposite one another are at approximately the same angle. Of course, it is possible to render possible a certain angle variation in the range of up to about +/−5°.

It was found that a linear movement of this type by the sealing ring starts when the connecting line through the two rounded corners of the rectangular cross section lying opposite one another intersects the respective cone line in the sealing seat on the housing side and on the disk side at approximately a right angle. This is accomplished by making the right angles to lie at different levels with respect to a horizontal plane. With reference to FIG. 6 of the '585 reference, the two right angles lying opposite one another are formed by the end faces of the rectangular cross section of the sealing ring lying obliquely as shown there. This is completely different from the present invention, for there the sealing ring is aligned in a horizontal plane, and the edges of the rectangular cross section lying diametrically opposite one another form the mounting surfaces with the rectangular angle with respect to the housing side and the disk side valve seat.

Through this special effect it has been proven that the previously undesirable sliding of the sealing ring on the assigned housing-side and disk-side sealing surfaces no longer occurs. Instead, a snug, load-transferring seat transferring high sealing forces occurs, without there being a danger of the chip-removing disturbance of the sealing seats lying opposite one another.

In a preferred embodiment the sealing ring is made of a metal material, such as, for example, stainless steel, high nickel alloys, and the like. Of course, it is also possible to use other suitable materials such as, for example, metal/plastic compound materials, graphite materials, and copper and bronze alloys.

The housing with the housing-side sealing seat is preferably embodied from a stainless steel, just like the sealing seat embodied on the disk side.

It is an advantageous feature that the sealing ring according to embodiments of the invention can be produced very easily, since it does not have any oblique or conical surfaces. It therefore does not slide in terms of a chip-removing destruction of the housing-side and disk-side sealing surfaces, and the radii on the edges lying diametrically opposite one another are set such that an angle is produced between a virtual line between the two radius center points that represents approximately a right angle with the two conical sealing surfaces which, for their part, are embodied approximately parallel to one another.

This results in a distribution of forces that is easy to control. The radii that determine the radius of curvature at the corners of the rectangular cross section of the sealing ring in extreme cases can be enlarged such that they come together at a single point (or even slightly intersect). As defined by the present invention, however, a relatively small radius of curvature is preferred, so that the two radius center points therefore lie apart from one another on one line that goes through respectively one of the edges of the rectangular cross section lying opposite one other.

With an arrangement of this type of the two radii embodied apart from one another, there is the advantage that a high sealing effect is achieved with relatively low sealing forces. Accordingly, the force expenditure on the part of the spindle drive is lower than with the prior art.

The present invention is intentionally and specifically based on the knowledge that an inherent deformation of the ring is necessary in order to achieve the required sealing forces. This is where the invention comes in, which provides that the ring comprises a generally rectangular cross section that deflects or deforms only insignificantly or not at all, and that only the sealing forces on the relatively small sized radii with respect to the valve seats lying obliquely opposite one another on the housing side and the disk side are achieved.

The introduction of force is arranged such that the parts involved (inner and outer cone of the respective sealing surface) at the decisive point (namely, where the sealing ring touches them) yield only slightly or not at all. Further embodiments are also possible and conceivable, for example, as a damper, sliding shuttle, in-line valves, valve flaps, butterfly valves, or also to seal a flange connection. However, the same principles also apply to these embodiments as well as the features shown here by way of example for an angle valve.

BRIEF DESCRIPTION OF THE DRAWING

Embodiments of the invention, as well as their features and advantages, are explained in more detail below based on drawings showing only one way of carrying out the invention, in which.

DETAILED DESCRIPTION OF THE PREFERRED EMBODIMENTS

Figure 1:
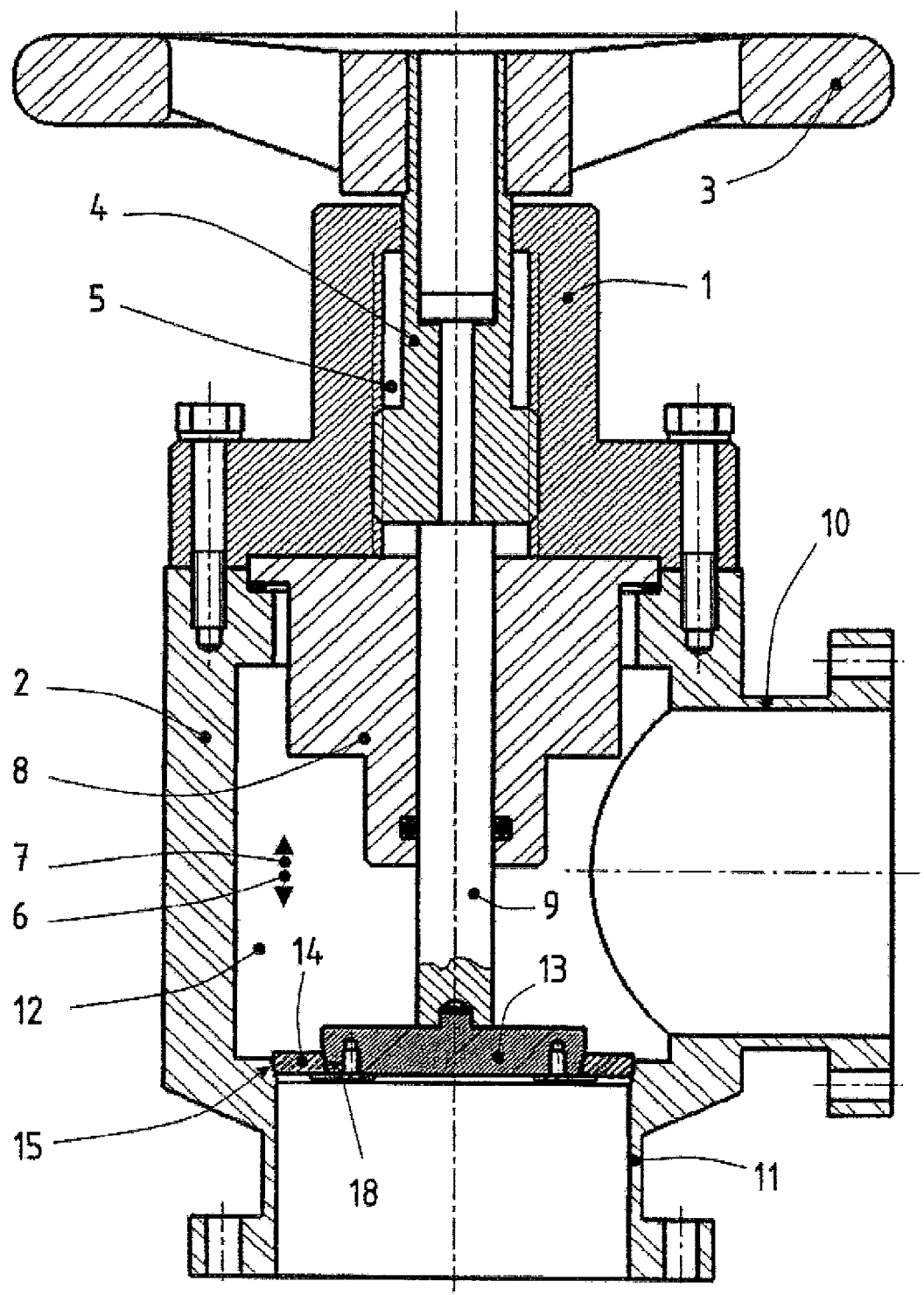
FIG. 1 is a diagrammatic representation of a section through a vacuum valve with a sealing ring according to the invention.

With reference now to the drawing, and more particularly to FIG. 1, there is shown drive housing 1 connected to valve housing 2 via corresponding suitable screws. The drive housing is punched through by spindle 4 that is connected to handwheel 3 in a rotationally fixed manner. The spindle is in threaded engagement with an inside threaded hole in drive housing 1 so that when the handwheel is rotated, valve rod 9 is moved upward in arrow direction 6, or downward in arrow direction 7.

In a known manner valve housing 2 is provided with guide 8 for the sealed guiding of valve rod 9.

The valve housing forms interior 12 into which inlet flange 10 opens. Outlet flange 11 is arranged on the other side of the seal, which will be described below.

The terms "inlet flange" and "outlet flange" can be interchanged with one another. It is immaterial from which side the medium flows in and flows out.

Valve disk 13 is secured at the free end of valve rod 9 and the valve disk is, in turn, connected to sealing ring 14. A focus of the present invention is how the action of sealing ring 14 cooperates with disk-side sealing valve seat 18 and housing-side valve sealing seat 15.

Further details are shown in FIGS. 2-5. In a comparison of FIGS. 2, 3, and 5 it is discernible that the sealing ring according to the invention comprises a generally rectangular cross section 23, wherein the corners of the rectangular cross section lying diametrically opposite have respective radii 20*a*, 20*b*. It is preferred that radii 20*a*, 20*b* are formed to be approximately the same. It is discernible from FIG. 2 that housing-side valve seat 15 is formed by cone line or surface 19*a* and upper radius 20*a* of sealing ring 14 bears against this oblique cone line, which has an angle of, for example, 10° to the vertical, in a load-transferring and sealing manner.

Furthermore, disk-side valve seat 18 likewise has cone line or surface 19*b* with approximately the same alignment and, in turn, radius 20*b* of the diametrically opposite edge to radius 20*a* of rectangular cross section 23 bears against cone line 19*b*.

Figure 2:
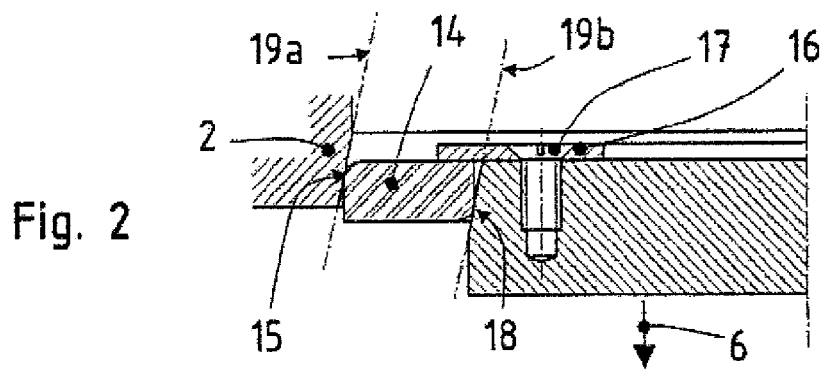
FIG. 2 is an enlarged representation of the sealing ring of FIG. 1 in the closed position, with the elements rotated by 180°.
Figure 3:
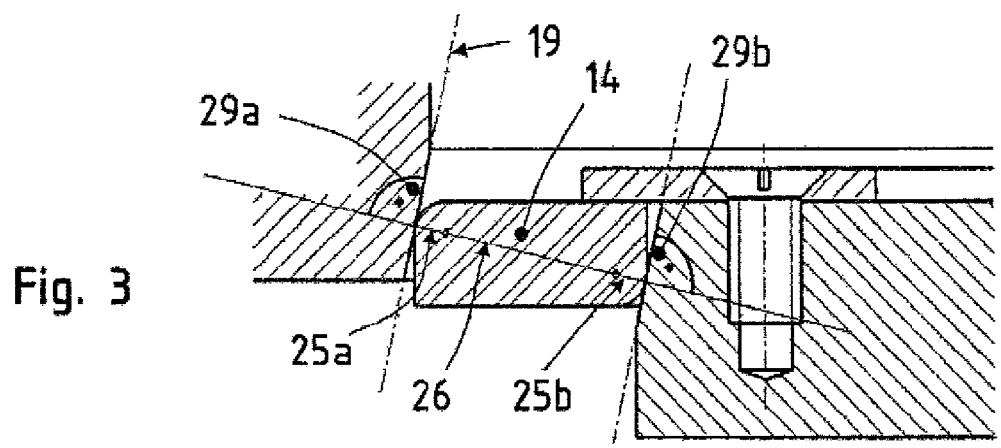
FIG. 3 is the sealing ring of FIG. 2 with further details.

FIGS. 2 and 3 show that sealing ring 14 is arranged lying generally horizontally because it is held on its top side by disk 16 that is secured by means of screw 17 to valve disk 13. The sealing ring therefore does not tilt and does not perform any side tilts with respect to valve disk 13. It therefore moves in a linear manner in arrow direction 6 (FIG. 2) in the open direction and in the closed direction in arrow direction 7 along valve seats 15, 18.

With this structure, no tilting occurs and there is no collision with a corresponding chip-removing destruction of valve seats 15, 18 lying diametrically opposite one another.

FIG. 3 shows that radius center points 25a, 25b of respective radii 20a, 20b lie on virtual connecting line 26, which connecting line goes through the edges of rectangular cross section 23 lying opposite one another, and housing-side cone line 19a and disk-side cone line 19b intersect line 26 at approximately a right angle 29a, 29b. Thus, angles 29a, 29b lie opposite one another arranged offset with respect to one another regarding a horizontal line, which right angles define the sealing engagement of sealing ring 14 on the assigned housing-side valve seat 15 or the disk-side valve seat 18.

Instead of a possible tilting or side tilt, therefore, a linear pushing of this sealing ring occurs according to the invention.

Figure 4:
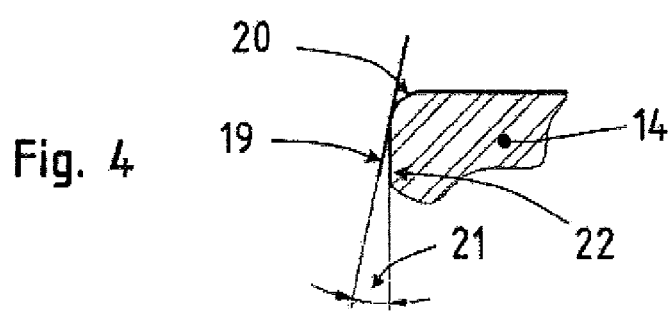
FIG. 4 is an enlarged representation of the sealing engagement of the sealing ring on the housing-side valve seat of the invention embodiment shown in FIG. 2.
Figure 5:
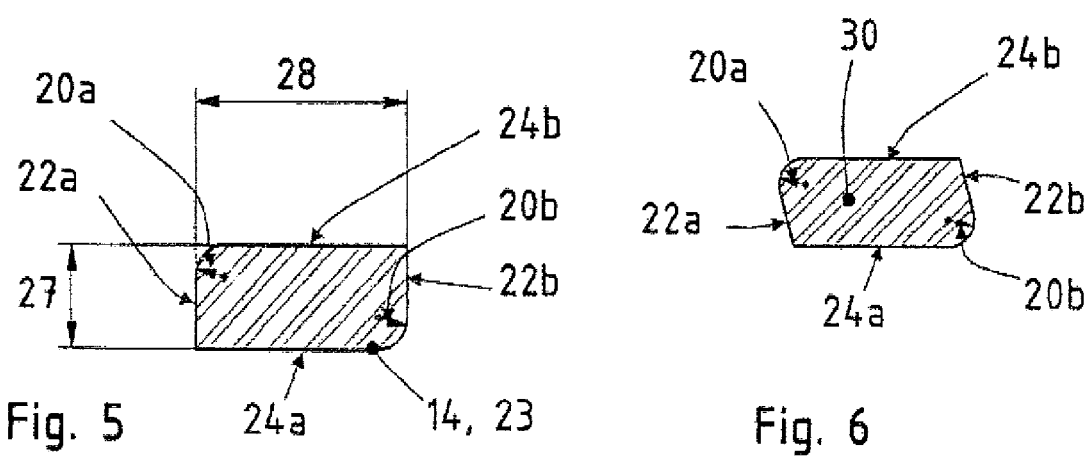
FIG. 5 is an enlarged representation in diagrammatic form of a cross section of the sealing ring according to the invention.

FIG. 4 shows that the angle 21 can be approximately 10°, that is, it is important that only radii 20a, 20b lying diametrically opposite one another come into sealing engagement with valve seats 15, 18, and other parts of sealing ring 14 do not. This means that, for example, straight lines 22a, 22b lying opposite one another that describe the vertical lines of the rectangular cross section of sealing ring 14 do not necessarily have to be parallel to one another, as shown by FIG. 5, where they are embodied as vertical lines. However, they can also be embodied according to FIG. 6 as lines lying obliquely and arranged generally parallel to one other, whereby a parallelogram cross section 30 is produced for the cross section of the sealing ring. It should be noted that these straight lines need not be parallel to each other.

Figure 6:
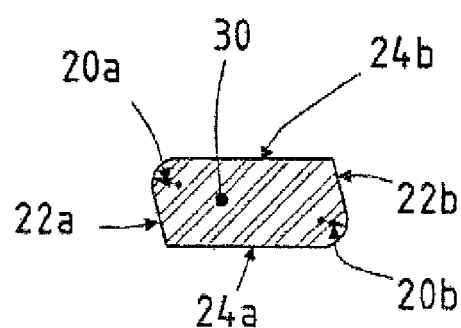
FIG. 6 is an embodiment modified with respect to FIG. 5.

It is likewise possible to replace the alignment according to FIG. 6 with that according to FIG. 5, so that, for example, the straight line 22a in FIG. 6 is replaced by a vertical straight line 22a in FIG. 5 or, conversely, also the straight line 22b lying obliquely in FIG. 6 is replaced by a straight vertical line 22b according to FIG. 5, or both.

The same also applies to the horizontal lines 24a, 24b, which can deviate from one another and need not be parallel, nor need they be straight. For example, lines 24a, 24b can be embodied in a convex manner or have points.

The above explanation shows that with an approximately rectangular cross section of sealing ring 14 lying horizontally, it bears against valve seats 15, 18 arranged vertically offset to one another, and only the corners of the sealing ring lying diametrically opposite one another play a role, because they come into sealing engagements only with the valve seats assigned to one another.

The other corners of this rectangular cross section lie outside this sealing engagement and the lines connecting these corners to one another can be selected in a relatively free form. However, the shaping according to FIG. 5 is preferred for easier production of the sealing ring. The ratio of height 27 to width 28 of the generally rectangular cross section results from the geometric preference that connecting line 26 (FIG. 3) through the two edges lying diametrically opposite should respectively intersect at right angles the cone lines 19a, 19b lying opposite.

The size of the radii 20a, 20b can be selected relatively freely, it need only be ensured that the transferred forces do not lead to damage to the housing-side or disk-side valve seat 15, 18.

The cone angles in seating valve seats 15, 18 are otherwise chosen such that the sealing ring 14 does not load these valve seats 15, 18 in a self-locking manner, but can be freely moved on these valve seats from an open position into a closed position.

What is claimed is:

1. A vacuum valve having an open condition and a closed state resulting from a closing operation, the vacuum valve comprising:
    a housing having a sealing seat formed with a cone surface at a first cone angle;
    a valve disk having sealing seat formed with a cone surface at a second cone angle; and
    a sealing ring configured to be only slightly elastic, and during the closing operation and closed state of said valve disk, said sealing ring deforms only slightly or does not deform;
    said housing sealing seat and said disk sealing seat being arranged in spaced relationship with said respective cone angles being approximately the same and said sealing ring being positioned between said cone surfaces and fixed to said valve disk throughout the movement of said disk from the open condition to the closed state;
    said sealing ring cross section being essentially rectangular or rhombic or square and being formed with two substantially parallel spaced first sides and two substantially parallel spaced second sides, each said first side intersecting one of said second sides to form a point and each said first side intersecting the other of said second sides with a rounded profile, the cross section of said sealing ring having diametrically opposite rounded profile corners having radii of curvature shaped and configured to sealingly engage said housing and disk sealing seats when the vacuum valve is in the closed state, said opposite rounded profile corners being spaced radially and diametrically from one another, said sealing ring being formed with a symmetry axis aligned in a horizontal plane approximately perpendicular to the movement direction of said valve disk.

2. The vacuum valve according to claim 1, wherein the radii of curvature of said diametrically opposite corners of said sealing ring are approximately the same size.

3. The vacuum valve according to claim 1, wherein the radii of curvature of said diametrically opposite corners of said sealing ring are different sizes.

4. The vacuum valve according to claim 1, wherein the radii of curvature lie at different heights with respect to the movement direction of said valve disk.

5. The vacuum valve according to claim 1, wherein said sealing ring is formed from material selected from stainless steel, high nickel alloys, metal/plastic compound materials, graphite materials, copper alloys, and bronze alloys.

6. The vacuum valve according to claim 1, wherein at least the cone surfaces of said sealing seats are comprised of stainless steel material.

7. The vacuum valve according to claim 1, and further comprising a longitudinally displaceable valve rod on which said valve disk is arranged.

8. The vacuum valve according to claim 1, wherein a connecting line through the two center points of the radii of curvature intersects the two cone surfaces of the respective housing and disk valve seats approximately at a right angle.

9. The vacuum valve according to claim 8, wherein the two center points of the radii of curvature converge.

* * * * *